3,679,462
METHOD FOR PERFECTING AIRCRAFT EMERGENCY LANDING
Donald J. Pistilli, Morristown, and Edward R. Degginger, Convent Station, N.J., assignors to Allied Chemical Corporation, New York, N.Y.
No Drawing. Filed Oct. 16, 1970, Ser. No. 81,621
Int. Cl. B44d 1/08, 1/12
U.S. Cl. 117—105.5
6 Claims

ABSTRACT OF THE DISCLOSURE

Aqueous dilatant solutions containing 0.5 to 6.0 weight percent alkali metal borate and 0.5 to 6.0 weight percent water-soluble polyvinyl alcohol can be rapidly applied to the surface of aircraft runways to provide a spark and fire-retardant cushion for emergency aircraft landings. This dilatant solution is preferably formed by mixing two aqueous systems, one containing borate and the other PVA. The mixing is preferably effected by spraying converging streams of the two solutions.

BACKGROUND OF THE INVENTION

This invention relates to a method for providing a fire and spark resistant cushioning coating for aircraft runways. More particularly, this invention relates to the use of aqueous dilatant solutions containing alkali metal borate and polyvinyl alcohol to provide such coating.

Under both military combat and nonmilitary circumstances, aircraft must occasionally make emergency landings at airfields or on the decks of aircraft carriers. Such landings are frequently so-called belly landings, wherein the aircraft landing gear is completely or partially inoperable. To reduce structural damage to the plane undertaking an emergency landing and most importantly to reduce the tendency for fuel spilled during the landing to ignite, the runway or aircraft carrier deck is sprayed with a variety of aqueous foams. These aqueous foams are designed both to cushion the landing, prevent spilled fuel ignition and extinguish any spilled fuel which does ignite. The large number of emergency landings which still result in severe damage to the plane and at least in many instances, total destruction thereof by fire makes improved emergency landing fluids essential.

SUMMARY OF THE INVENTION

It is an object of this invention to provide an improved runway and flight deck coating composition. Further objects and advantages will become apparent from the description of the invention which follows in greater detail.

It has now been found in accordance with the instant invention that an aqueous dilatant solution containing from 0.5 to 6.0 weight percent alkali metal borate and from 0.5 to 6.0 weight percent of polyvinyl alcohol is a superior runway and flight deck coating composition for emergency landings.

Since such dilatant solution contains water as its major component, it is therefore an excellent fire retardant and fire suppressant. Additionally, it is sticky so that it will readily adhere to the airfield or flight deck and to all exterior surfaces of the aircraft with which it comes in contact. Finally, the property of dilatancy possessed by the solutions of the instant invention is most significant. Such property of thickening under applied stress imparts shock absorbing qualities to the applied solution so that it cushions to some extent the aircraft landing. This dilatant solution is also applicable to grass or dirt landing fields since because of its dilatancy, it has only a limited tendency to be absorbed into the soil.

What the invention comprises therefore is applying to the surface of an airport runway or aircraft carrier flight deck an aqueous dilatant solution prior to the landing thereon of an aircraft. Obviously, such emergency landing procedure needs be followed only when the aircraft is disabled or some other difficulty in landing is anticipated. The rate of dilatant solution application will vary somewhat with the size, i.e. weight of the plane, but in general a suitable application rate will vary from about 10 to about 100 gallons per 100 square feet, of runway surface. It should be borne in mind, however, that the upper limit of application rate is determined primarily by the time available for application and by economic practicability.

The dilatant solutions of the instant invention can, of course, be prepared by separately adding borate and PVA to an agitated and preferably heated aqueous menstruum, or by combining separate aqueous PVA and aqueous borate solutions. Alternatively, the dilatant solution can be generated from converging streams of borate and PVA solution immediately prior to deposition of the combined stream on the runway surface.

That is, in the practice of our invention, the separate aqueous solutions of alkali metal borate and PVA would be separately stored, ordinarily in tanks or similar containers, although for certain large scale operations, other type containers can also be utilized. When it is desired to apply the dilatant composition to the runway surface, converging streams of the two solutions are sprayed at the surface. The two streams on converging essentially instantaneously form the viscous dilatant solution having the aforementioned cushioning and fire suppressant properties. The convergence of the two streams can be effected at any point from the point at which the two streams exit from the dispensing apparatus up to the point at which the streams actually impinge on the runway surface since, as above indicated, the dilatant solution forms almost instantaneously. Preferably, the streams will be converged to form the dilatant solution as soon as possible after leaving the dispensing apparatus. This is most readily achieved by utilizing two immediately adjacent nozzles which are so shaped and positioned that the streams issuing from the respective nozzles converge essentially instantly after such emergence. Alternatively, the two nozzles can be arranged in concentric fashion with an outer nozzle essentially coaxially concentrically disposed around an inner nozzle with the exit apertures of both nozzles likewise being essentially concentric and coterminous. The exact fashion in which convergence of the streams is achieved is not critical since it is only necessary that convergence take place at some point between or even on the runway surface, as heretofore indicated. The advantage of utilizing a dilatant solution which is formed only immediately prior to its application to the runway surface is that a dilatant solution is not handled by mechanical equipment, that is, the convergence of the two streams is exterior to the dispensing mechanism.

Most suitably, the converging streams will be ejected by air pressure so that they will be in the form of comparatively small droplets interspersed with air. When such streams in the form of droplets converge, the resulting dilatant solution is in the form of a thick foam which is a particularly desirable form for purposes of the instant invention.

The pumping or other solution transfer equipment utilized to spray the converging streams is a matter of choice and any of the conventional equipment which is currently available for spraying essentially noncorrosive, aqueous solutions of wide viscosity range can be utilized.

The dilatant solutions of the instant invention contain from about 0.5 to 6.0 weight percent PVA and from about 0.5 to 6.0 weight percent alkali metal borate. Where the dilatant solution is being formed prior to use, the appropriate quantities of borate and PVA are merely added either simultaneously or consecutively to water preferably with heating and agitation. In the case where such dilatant solution is obtained by the combination of two separate solutions as flowing streams, possibly at differing flow rates, the operable concentration of PVA and borate in the respective separate solutions prior to combination cannot be given with exactitude. Assuming equal volumes of the two solutions are being combined, the concentrations of the PVA and borate in the respective separate solutions could vary from 1.0 to 12.0 weight percent, which on combination would provide the final desired concentration of 0.5 to 6.0 weight percent. It is, of course, not necessary that the concentration of PVA and borate in the combined stream be identical since dilatant solutions are obtained as long as both components are each present in the combined stream in a concentration ranging from 0.5 to 6.0 weight percent. The preferred concentration of alkali metal borate and vinyl alcohol polymer in the dilatant solutions of this invention will range from about 2.0 to 6.0% by weight of each.

To increase the solubility of the borate in cold water, we have found it advantageous to add to the water prior to or simultaneously with the borate from 0.5 to 10 weight percent, based on the weight of the water present in the dilatant solution as ultimately constituted, of a $C_2$ to $C_{12}$ water-soluble polyhydric alcohol.

In the case where the borate and PVA are dissolved in separate solutions which are thereafter combined, the concentration of polyhydric alcohol, even as borate, will of course, be greater in the borate containing solution prior to combination with the PVA containing solution to form the dilatant solution. The concentration of polyhydroxy alcohol in the borate solution should be such as to afford a concentration of polyol in the dilatant solution ranging from 0.5 to 10.0 weight percent, preferably 3.0 to 7.0 weight percent.

The term "water-soluble polyhydric alcohol" as used in the instant application connotes a $C_2$ to $C_{12}$ polyhydroxy nonaromatic hydrocarbon, i.e. alkane, alkene, cycloalkane or cycloalkene, having from 2 to 8 hydroxyl groups. The term "water-soluble," as applied to such polyols, connotes that the polyol is soluble in water to the extent of at least 25 weight percent at 25° C.

Examples of suitable water-soluble $C_2$ to $C_{12}$ polyhydroxy nonaromatic hydrocarbons include, for example, ethylene glycol, diethylene glycol, triethylene glycol, trimethylene glycol, mono- and dipropylene glycol, glycerol, erythritol, pentaerythritol, trimethylol ethane and trimethylol propane, arabitol, adonitol, xylitol, mannitol, sorbitol, iditol, dulcitol, mono- and disaccharides such as glycose, dextrose, fructose, sucrose, Enzose,[1] and the like, and the various isomeric cyclohexane triols and n-hexane triols. More preferred are glucose, Enzose, and sucrose.

The term "alkali metal borate," as used in the instant specification and in the appended claims, embraces not only the alkali metal salts of the common boric acids, i.e., tetraboric acid, $H_2B_4O_7$, meta-boric acid, $HBO_2$, and orthoboric acid, $H_3BO_3$, but also the other boric acids such as $H_2B_2O_4$, $H_2B_6O_{10}$, $H_2B_{12}O_{19}$, $H_6B_4O_9$, and $H_6B_8O_{15}$. With the exception of the meta- and orthoborate salts, such alkali metal borates have the general formula: $M_2O \cdot mB_3O_2$, wherein M denotes an alkali metal and $m$ can range from 1 to 4. Hydrates of the above enumerated borate salts are also suitable.

Either a single borate salt or any mixture thereof can be used. Ordinarily, no advantage accrues from the use of a mixture of borates. Likewise, although alkali metals other than sodium and potassium are perfectly usable, they are not preferred for economic reasons.

---

[1] Enzose is a trademark of the Corn Products Co.

The preferred borate is borax, i.e., sodium tetraborate decahydrate.

The term "water-soluble vinyl alcohol polymer" as used herein and in the appended claims embraces vinyl alcohol polymers having up to 50% of the hydroxyl groups thereof replaced by methoxy, ethoxy, acetyl, propionyl, or butyryl radicals, i.e., partially etherified or esterified polyvinyl alcohol. Said methoxy and ethoxy ether radicals can be unsubstituted or substituted with hydroxyl or carboxyl groups. Said acetyl, propionyl and butyryl radicals can likewise be unsubstituted or can be halogen- or hydroxyl-substituted. Preferably, no more than about 20% of the polyvinyl alcohol hydroxyl groups will be replaced by any of the aforementioned ether or ester radicals. The term "water-soluble" means that the polymer is soluble to the extent of at least 5.0 weight percent in water at room temperature, although heating the water to a higher temperature of up to 95° C. may be necessary in some instances to initially dissolve the polymer.

The vinyl alcohol polymers utilized in the practice of the instant invention can, therefore, be represented by the structural formula

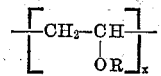

wherein $x$ can range from about 1200 to about 5000, preferably 1600 to 3000, and wherein R represents hydrogen-, methyl-, ethyl-, acetyl-, propionyl-, butyryl-, hydroxyl-, or carboxyl-substituted methyl or ethyl, or halogen- or hydroxyl-substituted acetyl, propionyl or butyryl, and wherein at least 50% of said R groups are hydrogen. The water-soluble vinyl alcohol polymers of the instant invention can have molecular weights ranging from about 50,000 to about 450,000, and preferably from about 70,000 to 200,000. As above indicated, preferably at least 80% of said R groups will be hydrogen.

Vinyl alcohol polymers are conventionally obtained by polymerizing esters of vinyl alcohol followed, where appropriate, by saponification of the ester groups. To prepare the polymers of the instant invention, wherein up to about 50% of the R groups are acyl, one polymerizes the corresponding vinyl ester to afford the polyvinyl ester having all R groups acyl and then partially or fully saponify said polyvinyl ester and thereby remove 50% or more of the acyl groups. For example, to prepare polyvinyl alcohol containing 20% acetyl groups, polyvinyl acetate would be 80% saponified and the remaining 20% acetyl groups be left unsaponified. To prepare the methoxy and ethoxy ether derivatives of polyvinyl alcohol, a fully saponified material, i.e. polyvinyl alcohol having 98+% hydroxy groups, as would be obtained by essentially total saponification of a polyvinyl ester, is etherified up to the desired degree, that is, up to a maximum of about 50% of the hydroxyl groups can be etherified using conventional etherification agents such as diazomethane, dimethyl sulfate or diethyl sulfate.

An even more superior dilatant fluid for use in emergency landing conditions can be obtained by having in the dilatant solution foaming agent of the type utilized in creating so-called "light water." The advantage imparted by the presence of such an additive is that it makes the dilatant solution much more effective at extinguishing any spilled fuel which becomes ignited since it enables the dilatant solution to cover and thereby extinguish the spilled fuel instead of the burning fuel floating on the dilatant solution.

While a wide variety of fluorocarbon compounds will function as light water agents, they all have certain characteristics in common. In general, such fluorocarbon compounds provide long-chain, surface active cations or anions which have a terminal perfluoroalkyl chain that is both hydrophobic and oleophobic and therefore repellant to water and to hydrocarbons. The molecules are capable of concentrating on the surface of water or hydrocarbon fuel and form an oriented surface film with the perfluorocarbon end pointed upward.

Suitable fluorocarbon compounds are described in U.S. Pats. 3,258,423 and 3,257,407 and in copending, commonly assigned applications Ser. Nos. 823,520 filed May 9, 1969 and 885,328 filed Dec. 15, 1969, now abandoned. Examples of the compounds disclosed therein include the following: perfluorocarboxylic and perfluorosulfonic acids, represented by the general formula, $R_fCO_2H$ and $R_fSO_2H$, respectively. In the carboxylic acid molecule, the $R_f$ is a perfluoroalkyl chain of seven carbon atoms, $C_7F_{15}-$, and in the sulfonic acid molecule, the $R_f$ is a perfluoroalkyl chain of eight carbon atoms, $C_8F_{17}-$. The perfluoroalkyl $R_f$ may be a straight chain or a branched chain. Preferred fluorocarbons which are useful for the purposes of the present invention comprise the following quaternary nitrogen compounds which have in their molecular structure an intermediate amidopolymethylene linkage:

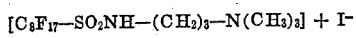
[$C_8F_{17}-SO_2NH-(CH_2)_3-N(CH_3)_3$] + I⁻

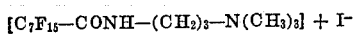
[$C_7F_{15}-CONH-(CH_2)_3-N(CH_3)_3$] + I⁻

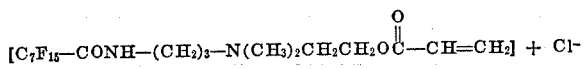
[$C_7F_{15}-CONH-(CH_2)_3-N(CH_3)_2CH_2CH_2OC-CH=CH_2$] + Cl⁻
               O

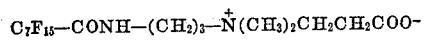
$C_7F_{15}-CONH-(CH_2)_3-\overset{+}{N}(CH_3)_2CH_2CH_2COO^-$

An additional fluorocarbon which is also suitable for the preparation of the present foam is the sulfonamido aliphatic acid salt represented by the formula:

$C_8F_{17}SO_2N(C_2H_5)CH_2COOK$

Compounds of the structure:

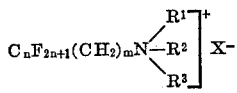

wherein n is from 3 to about 20, m is from 3 to about 30 and wherein

represents a radical derived from a member selected from the group consisting of ammonia; pyridine; quinoline; picoline; and primary phenyl amine; and X is selected from the group consisting of a halide ion, a sulfate anion, a phosphate anion, an arylsulfonate anion and an alkylsulfonate anion.

Quaternary ammonium compounds of the formula

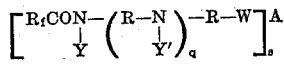

wherein $R_f$ is a polyfluoroisoalkoxyalkyl radical of the formula

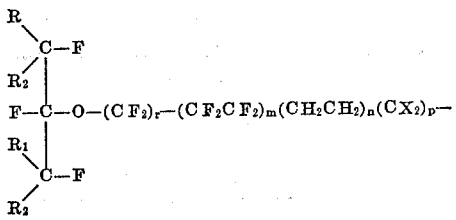

wherein $R_1$ and $R_2$ independently at each occurrence can be fluorine, chlorine, perfluoroalkyl or together can form a cyclic perfluoroalkylene group with the proviso that both $R_1$ and $R_2$ cannot be chlorine; m and n are integers from 0–20; the sum of m and n is 0–20; r is an integer from 0–1 and is 0 when the sum of m, n, and p is greater than 0 and is always 1 when the sum of m, n, and p is 0; p is an integer from 0–1; X can be hydrogen or fluorine with the proviso that when n is 1 or more, X must be hydrogen; Y can be hydrogen or alkyl of 1–6 carbon atoms;

q is an integer from 0–2; R independently at each occurrence is an alkylene group of 1–6 carbon atoms; Y' independently at each occurrence can be hydrogen, alkyl or hydroxyalkyl of 1–6 carbon atoms, acyl of the formula

wherein $R_f$ has the aforesaid meaning, or

wherein R and Y have the aforesaid meanings and Z is hydrogen, alkyl of 1–6 carbon atoms, or acyl of the formula

wherein R has the aforesaid meaning; W is a quaternary ammonium radical, A is an accompanying anion and s is an integer from 1 to 3 and is equal to the negative charge of A, and compounds of the formula:

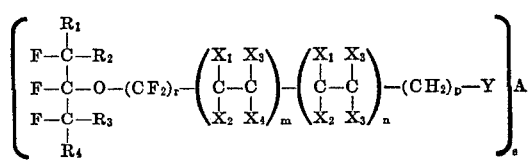

wherein (a) $R_1-R_4$ can be independently selected from the group consisting of fluorine, chlorine and perhaloalkyl groups of 1 to 10 carbon atoms, or when taken together $R_1-R_4$ may form a perhalocycloalkyl structure, the halo portions of $R_1-R_4$ being fluorine or chlorine, with the provisos that each carbon atom of $R_1-R_4$ contain at least one fluorine atom, no more than three of $R_1-R_4$ are haloalkyl groups, $R_1$ and $R_2$ cannot both be chlorine and $R_3$ and $R_4$ cannot both be chlorine;

(b) $X_1-X_4$ independently can be hydrogen, fluorine, chlorine or bromine, provided that each $X_1-X_4$ group do not include more than two chlorine atoms or one bromine atom, and when $X_1$ and $X_3$ independently are each hydrogen or fluorine, each of $X_2$ and $X_4$ independently may be $CF_2R_5$ wherein $R_5$ is a radical selected from the group consisting of fluorine, chlorine alkyl of 1 to 8 carbon atoms, or haloalkyl of 1 to 8 carbon atoms in which the halogen atoms are fluorine, chlorine or bromine, the $(X_1X_2C-CX_3X_4)_m$ and $(X_1X_2C-CX_3X_4)_n$ moieties may be the same or different;

(c) Y is a nitrogen-containing radical selected from the group consisting of thiourea and alkyl or hydroxyalkyl substituted thiourea connected through their S atom to the terminal C atom of the polyfluoroisoalkoxyalkyl radical, and pyridine, quinoline, alkyl or hydroxyalkyl substituted pyridine and alkyl or hydroxyalkyl substituted quinoline, connected through their N atoms to the terminal C atom of the polyfluoroisoalkoxyalkyl radical, said alkyl and hydroxyalkyl substituents containing from 1 to 3 carbon atoms;

(d) A is an accompanying anionic moiety;

(e) r is an integer from 1–2, m and n are integers from 0–20, the sum of m and n is 0–20, with the proviso that when p is 0, n must be at least one and $X_3$ and $X_4$ in the $(X_1X_2C-CX_3X_4)_n$ moiety must be hydrogen and s is an integer from one up to the total negative charge of A.

Fluoroalkyl amides are also known to be useful as light water fluorocarbon foaming agents. Suitable compounds are described in copending applications Ser. No. 749,302 filed Aug. 1, 1968, now U.S. Pat. No. 3,600,415 and in Ser. No. 53,705 filed July 9, 1970.

Exemplary compounds include:
Amidoamine oxides of the formula

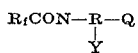

wherein $R_f$ is a perfluoroalkyl radical of 4 to 25 carbon atoms or a polyfluoroisoalkoxyalkyl radical of the formula

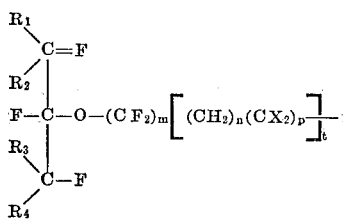

wherein $R_1$, $R_2$, $R_3$ and $R_4$ independently at each occurrence can be fluorine, chlorine, perfluoroalkyl of 1 to 9 carbon atoms or one of $R_1$ and $R_2$ and one of $R_3$ and $R_4$ taken together can form a cyclic perfluoroalkylene group with the proviso that no more than two of the four $R_1$–$R_4$ groups are chlorine atoms and provided further that no more than two of the four $R_1$–$R_4$ groups are perfluoroalkyl groups; $m$ is an integer 1 to 40; $n$, $p$, and $t$ are each integers 0 to 20, the sum of $m$ and $t$ $(n+p)$ being 2 to 41, with the proviso that when $n$ is odd, $p$ is odd, and when $n$ is even, $p$ is even; X is hydrogen or fluorine;

Y is hydrogen or alkyl of 1 to 6 carbon atoms;
R is a straight- or branched-chain alkylene radical of the formula

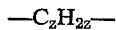

wherein $z$ is an integer of 1 to 6; or
a covalent bond between nitrogen and a carbon atom in Q;

Q is
(A) an aliphatic amine oxide radical of the formula:

wherein $R_5$ and $R_6$ are each alkyl radicals of 1 to 6 carbon atoms or hydroxy-terminated alkyl radicals of 2 to 6 carbon atoms,
(B) a cycloaliphatic amine oxide radicals of the formula:

wherein Z is a divalent radical of the formula:

$$-(CH_2)_4-$$
$$-(CH_2)_5-, \text{ or}$$
$$-(CH_2)_2-O-(CH_2)_2-, \text{ or}$$

(C) an aromatic heterocyclic amine oxide radical selected from pyridyl-N-oxide radicals and quinolyl-N-oxide radicals;

with the proviso that when Q is the said aliphatic amine oxide radical or the said cycloaliphatic amine oxide radical, R is always the said alkylene radical, and compounds having the formula

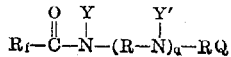

wherein
(a) $R_f$ is a radical having the formula

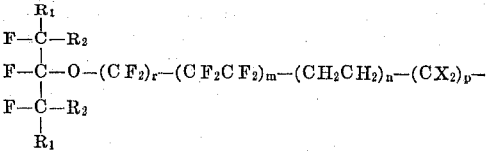

wherein
(i) $R_1$ and $R_2$ are fluorine or are fluoroalkyl groups, or, taken together are fluoroalkylene groups forming a cycloaliphatic structure, which $R_1$ and $R_2$ groups may each have from 1 to 9 carbon atoms, provided that not more than three of the R and R groups may be fluoroalkyl groups.
(ii) $m$ and $n$ are each integers of from 0 to 10, with the proviso that the sum of $m$ and $n$ is from 0 to 20, and provided further that when $r$ is 0, $m$ is at least 1,
(iii) X is selected from the group consisting of hydrogen and fluorine, with the proviso that when $n$ is greater than 0, then X is always hydrogen,
(iv) $p$ is 0 or 1,
(v) $r$ is 0 or 1, with the proviso that when the sum of $m$, $n$, and $p$ is greater than 0, then $r$ is always 0, (b) Y is selected from the group consisting of hydrogen and alkyl having from 1 to 6 carbon atoms,
(c) R, which may be the same or different, is a divalent straight-chain or branched-chain alkylene bridging group containing from 1 to 6 carbon atoms,
(d) $q$ is an integer from 0 to 2,
(e) Q is a member selected from the group consisting of
(i) the pyridyl radical,
(ii) alkyl-substituted pyridyl radicals wherein the alkyl substituent or substituents contain from 1 to 2 carbon atoms, and
(iii) a radical having the formula

wherein $R^a$ and $R^b$ are independently selected from the group consisting of alkyl having from 1 to 6 carbon atoms and a radical having the formula —ROH wherein R has the aforestated meaning, (f) Y', which may be the same or different in different

groups is a member selected from the group consisting of
(i) hydrogen,
(ii) alkyl having from 1 to 6 carbon atoms,
(iii) a radical having the formula —ROH wherein R has the aforestated meaning,
(iv) an acyl radical having the formula

wherein $R_f$ has the aforestated meaning,
(v) a radical having the formula —RNYZ wherein R and Y have the aforestated meanings and Z is a member selected from the group consisting of hydrogen, alkyl having from 1 to 6 carbon atoms, and an acyl radical having the formula

wherein $R_f$ has the aforestated meaning, wherein $R^a$ and $R^b$, and $R^a$ and Y' when taken together, may be alkylene groups forming a cycloaliphatic structure.

The fluorocarbon foaming agent can suitably be present in either the PVA or in the borate solution or in both. As above indicated, the critical common denominator of these fluorocarbon foaming agents is that they are both oleophobic and hydrophobic. It is these characteristics that enable them to function as foaming agents.

The pumping or other solution transfer equipment utilized to spray the converging streams is a matter of choice and any of the conventional equipment which is currently available for spraying essentially noncorrosive, aqueous solutions of wide viscosity range can be utilized.

The invention can be more fully understood by reference to the following examples. All parts are parts by weight unless otherwise expressly noted.

In all the following experiments, scale models of the Boeing 707 jet aircraft were utilized. The actual aircraft has a fuselage length of 145 feet and a wing span of 130 feet. The model is 1/120 scale, approximately.

Example 1

To simulate emergency landing, aluminum models of a passenger jet aircraft were dropped from a height of ten feet onto a flat, poured concrete surface. Such a drop is considered to have approximately the same effect on the aircraft structure as belly landing a full-size aircraft on a standard runway at about 100 m.p.h.

In the first test, the model was dropped on dry concrete. Both wings broke at the base and the fuselage snapped approximately half way between the wings and the tail section.

In a second test, the concrete surface was covered with about 1/8" water. Structural damage to the second model was virtually identical.

In test 3, a dilatant solution containing 5.0 weight percent 98+% hydrolyzed polyvinyl alcohol of 100,000 mol. weight and 5.0 weight percent borax was applied to the concrete at a rate equivalent to 40 gallons per 100 square feet of concrete. Substantially less structural damage occurred to the dropped airplane. The wings buckled at the base, but did not snap off. The fuselage was severely dented but did not rupture.

A fourth test was conducted utilizing the dilatant solution of test 3 with 3.5 weight percent sucrose added. Structural damage to the plane was substantially identical to that in test 3.

Example 2

Various dilatant solution were evaluated for their ability to suppress hydrocarbon fires, specifically RP-1 jet fuel. A plane model was placed on a concrete surface. One litre of RP-1 jet fuel was poured over the model and ignited. The model was essentially totally destroyed by the fire in that severe buckling and distortion of all structural members occurred. Certainly all persons inside a plane subjected to such a fire would be killed.

In a second test, after ignition of the RP-1, the plane was sprayed with 100 cc./minute of distilled water. The burning RP-1 remained on the fuselage and continued to burn producing damage to the aircraft only slightly less severe and again, all persons inside a plane subjected to such a fire would probably have been killed.

In test 3, after ignition of the RP-1, the plane was sprayed with two converging streams—one stream being a 3.5 weight percent aqueous solution of 98+% hydrolyzed PVA of mol. weight 100,000, the other stream a 5.0 weight percent aqueous borax solution. Each stream was sprayed at a rate of 50 cc./minute and on converging, formed an aqueous dilatant solution which coated and adhered to the aircraft. Although the burning RP-1 floated on the dilatant solution and was not extinguished thereby, the aircraft was definitely protected to a substantially greater extent due to the adherent qualities of the dilatant solution. It seems certain that at least some of the passengers in a plane subjected to such combustion would have survived.

In test 4, the identical procedure was used except the borate containing solution also contained 4.0 weight percent glycerine. Results were essentially the same as in test 3.

Finally, a test 5 was run wherein the dilatant solution utilized was the same as in test 3 except that the PVA solution also contained 2.0 weight percent of

prepared in accordance with the teaching of U.S. Pat. 3,258,423. In this instance, the fuselage was again coated with the protective fluid and the RP-1 fuel fire was extinguished due to the formation of an aqueous film on top of the burning fuel. Fire damage was done to the airplane model.

We claim:

1. A process for providing a runway surface coating for emergency aircraft landings comprising applying to said runway surface an aqueous dilatant solution containing from about 0.5 to 6.0 weight percent alkali metal borate and from about 0.5 to 6.0 weight percent water soluble polyvinyl alcohol.

2. A process in accordance with claim 1 wherein said dilatant solution contains as an additional component 0.5 to 10 weight percent of a water soluble $C_2$ to $C_{12}$ polyhydric alcohol.

3. A process in accordance with claim 1 wherein said dilatant solution is formed by emitting from a dispensing mechanism converging streams of aqueous polyvinyl alcohol solution and aqueous alkali metal borate solution, said convergence being achieved exterior to said dispensing mechanism for said streams.

4. A process in accordance with claim 1 wherein said dilatant solution contains as an additional component 0.1 to 10 weight percent of a fluorocarbon foaming agent.

5. A process in accordance with claim 3 wherein said dilatant solution contains as an additional component 0.5 to 10 weight percent of a water soluble $C_2$ to $C_{12}$ polyhydric alcohol.

6. A process in accordance with claim 1 wherein said dilatant solution contains as additional components 0.1 to 10 weight percent of a fluorocarbon foaming agent and 0.5 to 10 weight percent of a water soluble $C_2$ to $C_{12}$ polyhydric alcohol.

References Cited

UNITED STATES PATENTS

| | | | |
|---|---|---|---|
| 2,550,134 | 4/1951 | Balassa et al. | 117—136 |
| 2,979,478 | 4/1961 | Melton et al. | 252—8.1 X |
| 3,384,182 | 5/1968 | Rotvand | 252—3 X |

EDWARD G. WHITBY, Primary Examiner

U.S. Cl. X.R.

117—104 B, 136, 165; 252—3, 8.1